(12) United States Patent
Williams et al.

(10) Patent No.: US 6,929,866 B1
(45) Date of Patent: Aug. 16, 2005

(54) COMPOSITE FOAM STRUCTURES

(75) Inventors: Brian E. Williams, Simi Valley, CA (US); Jerry Brockmeyer, Valencia, CA (US); Robert H. Tuffias, Pacoima, CA (US)

(73) Assignee: Ultramet, Pacoima, CA (US)

( * ) Notice: Subject to any disclaimer, the term of this patent is extended or adjusted under 35 U.S.C. 154(b) by 0 days.

(21) Appl. No.: 09/441,627

(22) Filed: Nov. 16, 1999

Related U.S. Application Data

(60) Provisional application No. 60/108,677, filed on Nov. 16, 1998.

(51) Int. Cl.[7] .............................. B32B 2/22; B32B 2/32
(52) U.S. Cl. .................... 428/613; 428/307.7; 428/699
(58) Field of Search ............................... 428/699, 701, 428/158, 306.6, 307.3, 307.7, 613, 609, 937, 428/545, 539.5, 553, 566, 69.9

(56) References Cited

U.S. PATENT DOCUMENTS

| | | | |
|---|---|---|---|
| 4,187,344 A * | 2/1980 | Fredriksson | ............. 428/307.7 |
| 4,198,839 A | 4/1980 | Linko, III et al. | |
| 4,331,621 A * | 5/1982 | Brockmeyer | ................ 264/628 |
| 4,429,003 A * | 1/1984 | Fredriksson et al. | ..... 428/317.9 |
| 4,540,535 A * | 9/1985 | Tomita et al. | ............... 264/321 |
| 4,560,478 A * | 12/1985 | Narumiya | ................... 210/496 |
| 4,568,595 A * | 2/1986 | Morris | ..................... 156/89.11 |
| 4,732,594 A * | 3/1988 | Mizrah et al. | ................. 55/523 |
| 4,856,887 A * | 8/1989 | Wakugawa et al. | ......... 359/883 |
| 4,991,797 A * | 2/1991 | Miller et al. | ............ 244/117 R |
| 5,082,805 A * | 1/1992 | Ali et al. | ....................... 501/15 |
| 5,122,182 A | 6/1992 | Dorfman et al. | |
| 5,154,373 A | 10/1992 | Scott | |
| 5,236,151 A * | 8/1993 | Hagle et al. | ............. 244/117 A |
| 5,746,793 A * | 5/1998 | Rink et al. | ................. 55/385.3 |
| 5,834,108 A * | 11/1998 | Shimai et al. | ........... 428/307.3 |
| 6,057,030 A * | 5/2000 | Mano | .......................... 264/44 |
| 6,106,903 A * | 8/2000 | Upadhya | ..................... 264/455 |

FOREIGN PATENT DOCUMENTS

| | | | |
|---|---|---|---|
| DE | 3905080 | * | 11/1989 |
| JP | 59-190248 | * | 10/1984 |
| JP | 61-042468 | * | 2/1986 |
| JP | 61-268850 | * | 11/1986 |
| JP | 62-246882 | * | 10/1987 |
| JP | 63-2873 | * | 1/1988 |

OTHER PUBLICATIONS

English language translation of Japanese publication 63-2873, pp. 1-4.*
Translation of Japanese Publication 63-2873, Jan. 7, 1988, 6 total pages.*
Sherman, Andrew J.; Tuffias, Robert H.; Kaplan, Richard B.; "Refractory Ceramic Foams: A Novel, New High-Temperature Structure" Ceramic Bulletin, vol. 70, No. 6, (1991) pp. 17-20.

(Continued)

*Primary Examiner*—John J. Zimmerman
(74) *Attorney, Agent, or Firm*—Bruce A. Jagger

(57) ABSTRACT

A composite rigid foam structure that has a skin or coating on at least one of its surfaces. The skin is formed in situ by thermal spray techniques. The skin is bonded substantially throughout the surface of the porous substrate to the peripheries of the pores. The skin on the average does not penetrate the surface of the substrate by more than the depth of about 2 to 5 pores. Thus, thermal spraying the skin onto the rigid foam produces a composite that is tightly and uniformly bonded together without unduly increasing the weight of the composite structure. Both thermal conductivity and bonding are excellent.

10 Claims, 2 Drawing Sheets

OTHER PUBLICATIONS

M.F. Ashby; R.F. Mehl Medalist; "The Mechanical Properties of Cellular Solids"; The 1983 Institute of Metals Lecture. The Metallurigical Sociey of AIME. vol. 14A, Sep. 1983; pp. 1755-1769.

Kutner, Gerald L.; "Thermal Spray by Design" Special Brefing Section. Reprinted from the Oct. 1998 issue of Advanced Materials, a process of corporatting Metal Progress Magazine. 4 Pages.

* cited by examiner

COMPOSITE FOAM STRUCTURES

RELATED APPLICATIONS

This application claims priority to provisional application No. 60/108,667, filed Nov. 16, 1998.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of SBIR Phase II contract No. NAS3-27239 awarded by NASA Glenn Research Center, and Contract No. F33615-01-C-5215 awarded by Air Force.

BACKGROUND OF THE INVENTION

1. Field of the Invention

This invention relates to the fabrication of composite rigid foam structures, and to the structures so fabricated. In particular, the structures are composed of a rigid foam material that has at least one face sealed or skinned with a thin skin that is tightly and uniformly adhered to but does not significantly penetrate the foam.

2. Description of the Prior Art

A cellular solid is made up of an interconnected network of solid struts or plates which form the edges and faces of cells, examples of which are shown in FIG. 1. See also, for example, L. J. Gibson and M. F. Ashby, *Cellular Solids*, Pergamon Press, First Edition 1988. The simplest is a two-dimensional array of polygons, which pack to fill a plane area and are typically called honeycombs. See FIG. 2(*a*). More commonly, the cells are polyhedra, which pack in three dimensions to fill space. Such three-dimensional cellular materials are called foams. If the solid of which the foam is made is contained in the cell edges only (so that the cells connect through open faces), the foam is said to be open-celled or reticulated. See FIG. 1 and FIG. 2(*b*). The cell edges or boundaries of the cell of open-cell or open-pore foams are often called ligaments. If the faces are solid too, so that each cell is sealed off from its neighbors, it is said to be closed-celled. See FIG. 2(*c*). Foams can contain, for example, both open- and closed-cells in the same body. Foams are differentiated by their material or materials or fabrication, whether open or closed, the number or cells per linear dimension and other parameters. A typical designation of cell size is cells or pores per linear inch (ppi).

Foams can be made by a number of processes and from a variety of materials. See, for example, A. J. Sherman et al, "Refractory Ceramic Foams: A Novel, New High-Temperature Structure", Ceramic Bulletin, Vol. 70, No. 6, 1991, which is hereby incorporated herein by reference. One process for fabricating open-pore foams involves coating/infiltrating an open-pored reticulated vitreous carbon foam by chemical vapor deposition/infiltration (CVD/CVI). This method allows the formation of foams of many different materials, including metals and ceramics. In this case the vitreous carbon foam is used as a skeleton for the CVD material and the skeleton is often, but not necessarily retained. FIG. 1 shows a reticulated rigid tantalum foam made in this way.

Open-pored foam materials are used for a wide variety of purpose, including, but not limited to, filtration devices, heat exchangers, catalyst supports, structural panels, or the like. Both open- and closed-pore foams are used as cores or elements for lightweight structures such as, for example, space mirrors, insulation, thermal protection systems and the like. See, for example, H. A. Scott, "Integral Structure and Thermal Protection System", U.S. Pat. No. 5,154,373, Oct. 13, 1992. For example, strong, lightweight structural members can be made up of two stiff, strong skins separated by a porous foam core. The separation of the skins by the core increases the moment of inertia of the panel with little increase in weight, producing an efficient structure for resisting bending and buckling loads. Used as heat exchangers, the open pore cellular materials may also require skins to contain the heat exchange media and/or to contain the pressure within the porous core.

The attachment of a skin or skins to foam materials had previously often been problematic because the surface of the foam material is composed of a multitude of discreet points or small areas rather than a continuous surface, which would lend itself to bonding or brazing or other similar attachment means. In addition, the difficulty of attachment is a function of the pores per inch (ppi) and the physical size of the ligaments or other attachment areas. As shown, for example, in FIG. 1, the area which must be bridged by the skin between adjacent ligaments is often at least five times or more the thickness of the ligaments. This is especially problematic when the skins are subjected to structural loads or hermetic seals are required, since any unattached areas weaken the structure or are points of potential leaks. In addition, it is difficult to detect areas that are not attached since they are hidden by the skins. Also repair of unbonded areas usually requires removal of the skin and reattachment. Even more problematic have been the cases where the surface of the porous material is not of simple geometry such as a flat surface or a cylinder. In these cases it had previously been nearly impossible to get total surface attachment of the skin to the porous material. In addition, when the skin and the porous material are made of different materials or when no compatible bonding agent is available, the optimum structure could not be formed.

In order to overcome these difficulties, in situ formation of the skins by chemical vapor deposition (CVD) has been attempted with little success. The results were that either too much of the "skinning material" penetrated into the porous material, increasing its weight beyond the useable range; or repeated cycles of deposition and machining were required at great cost. This was especially true of open-cell foams. Surface control and uniformity, especially with non-simple shapes, were also a problem. Repeatability was substantially non-existent.

These and other difficulties of the prior art have been overcome according to the present invention which provides for the fabrication of firmly and uniformly attached in situ skins on foam materials, utilizing nearly any combination of materials or geometry, and the structures so fabricated.

BRIEF SUMMARY OF THE INVENTION

According to the present invention, thermal spray processing is used to form the skins in situ on rigid open and closed-cell materials. Thermal spray processing is a generic term for a broad class of related processes in which molten droplets of metals, ceramics, glasses and/or polymers, singly or in combinations, are sprayed onto a surface. In principle, any material with a stable molten phase can be thermally sprayed. Deposition rates are very high in comparison to alternative coating technologies. Deposit thicknesses of, for example, 0.1 to 1.0 mm for fully continuous layers are common. If desired, thicknesses greater than 1 cm can be achieved with some materials. Thickness is controlled, for example, by rastering the spray nozzle back and forth over the part, and although this is a line-of-sight process, all areas can be coated by reorienting the substrate and the spray nozzle relative to one another, manually or robotically. Various irregular surface configurations can thus be accommodated. In situ formation is to be distinguished from a process where the skin is formed at some other location and applied to the porous substrate as a pre-formed sheet. An in situ process of formation according to the present invention deposits a fluid form of the material that forms the skin at the site where the skin is to be formed, and the skin is formed by the buildup of solidified material at that site.

In the application of thermal spray processing to the in situ formation of a skin on a porous material, the processing parameters such as, for example, viscosity, are optimized to control penetration of the skinning material into the porous substrate so as to minimize penetration while still achieving substantially complete bonding throughout the surface of the porous substrate. The characteristics of the fluid skinning material and the application parameters are controlled so that the skinning material penetrates the porous substrate sufficiently and solidifies around the solid elements of the porous material to obtain a good mechanical attachment. This is of particular concern with open-cell foams. If the pore size is too large, it may not be possible to completely seal the surface while also minimizing the weight of the skin. Foam with pore densities of less than about 20 to 30 ppi is often impossible to skin unless other means are combined with the thermal spray processing. In general thermal spraying according to the present invention is effective with foams that have pore densities larger than about 20, and preferably 30, pores per inch. In some cases metallurgical bonds can be achieved between the foam and the skin. That is, the material of either the skin or the substrate is soluble to some extent in that of the other. Such bonds are extremely strong. The thickness of the skin is defined by the structural requirements of the application and is obtained by rastering the thermal spray nozzle over the part until the required thickness is achieved. In some cases, an excess of skin material may be applied and then machined to the appropriate geometry. Thermal spray techniques are well known. See, for example, Lech Pawlowski, "Science & Engineering Of Thermal Spray Coatings", (J. Wiley & Sons, 1995).

Plasma spraying appears to be the most common form of the thermal spraying operations. In a plasma spraying process, an inert gas is passed through an electric arc, thus creating an extremely hot ionized gas. The desired coating material, in powder form, is injected into the hot ionized gas stream. In the gas stream at least a substantial portion of the powdered coating material becomes partially molten or plastic. In general, the particles are not fully melted. The fluid particles are quenched and bonded when they strike the surface of the substrate. The inert gas is delivered under pressure to the electric arc so that it picks up the molten or plastic coating material and accelerates it onto the surface of the substrate. At the substrate surface a layer-by-layer buildup takes place through interparticle bonding and sintering reactions as the spray nozzle is rastered back and forth over the surface. The nature of the deposit is such that it is particularly effective in closing out surface porosity without penetrating very far into the body of the rigid foam. Internal porosity (closed cell) is frequently produced in coatings that are produced by thermal spray operations. This internal porosity is generally beneficial in ceramic thermal barrier coatings where it reduces thermal stress and stresses associated with thermal expansion mismatch.

High velocity oxy-fuel (HVOF) thermal spray deposition processes involve the combustion of an oxygen-fuel mixture to generate a stream of gas that heats and accelerates the powdered feed to supersonic velocities. The combination of very high particle velocities and relatively low flame temperatures makes possible the production of coatings with improved mechanic properties and good thermal properties. This process is particularly suited to the application of ceramic coatings on silicon carbide foam substrates. In addition to combustion and plasma heaters, other means of heating, such as, resistance heaters, induction heaters and the like, can be used.

The controlling parameters in thermal spraying operations generally include the amount of arc energy or combustion energy, and the powder feed material composition, size, shape, feed rate, and velocity. The adjustment of these parameters to achieve a desired result is well understood in the art. In generally, the particles that are projected onto a substrate in a thermal spraying operation are not melted completely through. Also, particles that do not melt can be incorporated into the powders to form inclusions in meltable matrix materials in the coatings. As will be understood by those skilled in the art, the spraying parameters are optimized for a particular application based on preliminary tests. For example, in general, for an otherwise constant system, increasing the velocity of the carrier gas increases the density of the thermal sprayed coating. A reduction in the degree of melting and carrier gas velocity tends to reduce the penetration of the skin into the foam substrate, but a substantial increase in either melting or carrier gas velocity tends to drive the particles deeper into the rigid foam substrate.

The powdered feed materials that are suitable for use in thermal spray procedures generally range in size from approximately 250 to 2 microns. The carrier gas that entrains and carries the particles is generally the same as the plasma or combustion gas.

The skins or coatings, which are formed in situ according to the present invention, conform exactly to the surface of the rigid foam and, therefore, are bonded tightly, directly and uniformly across the entire skinned area of foam. Slight penetration of the coating into the substrate (1 to 5 pore diameters) is generally beneficial to bonding. The pores in the substrate are defined by their peripheries. In open celled foams the peripheries are defined by ligaments, and in closed cell foams the pores are defined by panes or panels. The requisite degree of completeness and uniformity of bonding could not be achieved by fabricating the skin separate from the foam and then joining the two through a bonding agent. The amount of bonding agent would generally have to be increased to accommodate possible mismatched areas, thereby increasing the weight of the structure. Also, the continuous formed in situ skins are often so thin that they could not be easily and reliably handled and applied if they were to be made separately from the foam. The uniform continuity of the skin, such as would be provided by a separately formed skin, is achieved according to the present invention by a thermally sprayed formed in situ skin. Even very thin formed in situ thermally sprayed skins (less than about 0.010 inches in thickness) which bridge between widely spaced ligaments, but do not penetrate at the most more than 2 or 3 cell diameters into the foam, are directly bonded to the foam, and uniformly continuous and unbroken. In addition to providing a good bond, the substantially full attachment to all of the pore peripheries provides very good thermal transfer from the foam to the skin.

The formed in situ skin bridges and adheres directly to the pores on the surface of the foam without penetrating on the average for a depth of more than approximately the diameters of 4 or 5 pores. Preferably the penetration is less on the average than approximately the diameters of 2 to 3 pores, into the foam. Preferably, a fully sealed continuous skin is achieved with a continuous layer that is generally no thicker than approximately 0.01 to 0.050, and preferably 0.01 to 0.020 inches thick. Thicker sealing layers can be used, if desired. For example, thicker layers can be used to provide enough mass to permit the precision machining of the exposed surface of the layer where close tolerances are required. The sealing layer forms a rigid bond directly to the foam wherein the composition of the bonding material is generally the same as the composition of the rest of the layer. The continuous surface skin serves to prevent fluids or other materials from passing through the sealed face of the foam. The skin also enhances the structural properties of the foam material and facilitates attachment of the foam to other components. If desired, areas of the foam can be masked so that the continuous skin only covers a part of the exposed surface of the foam. Such a partial coating, for example, permits fluid to flow into the reticulated foam in one area, through the foam, and out in a second area. Also, such partial coatings provide convenient attachment points for mounting the composites to other structures. Also, the thermal spray coating can be applied with uniform interconnected porosity, thereby allowing for uniform gas flow through the coating for applications such as transpiration cooling and filtering. Such porous coatings can be applied, for example, by reducing the degree of melting or the carrier gas velocity, or both, as is well understood by those skilled in the art.

The cellular solid substrates to which the present invention is applicable include rigid open and closed celled materials, and materials which contain both in one body. The advantages of the present invention are particularly beneficial to reticulated structural foams where the penetration of the skin forming material into the open cells to any significant depth would impair the advantages of the foam. Reticulated structural foams are employed in many instances because of their light weight and porosity. Any skin forming process that results in substantially increasing the weight of the skinned foam or impairs the porosity subverts the reason for using the light weight foam. Thus, the ability to fully seal the face of a foam structure by bridging across and bonding to the foam with a very thin layer, without significantly penetrating the foam, provides very significant advantages. For actively cooled structures, the foam-faceplate (skin) composite eliminates the need for complex and costly machining and attachment of coolant manifolds, channels, and the like.

Other objects, advantages, and novel features of the present invention will become apparent from the following detailed description of the invention when considered in conjunction with the accompanying drawings.

BRIEF DESCRIPTION OF THE DRAWINGS

The present invention provides its benefits across a broad spectrum of skinned foams. While the description which follows hereinafter is meant to be representative of a number of such applications, it is not exhaustive. As those skilled in the art will recognize, the basic methods and apparatus taught herein can be readily adapted to many uses. It is applicant's intent that this specification and the claims appended hereto be accorded a breadth in keeping with the scope and spirit of the invention being disclosed despite what might appear to be limiting language imposed by the requirements of referring to the specific examples disclosed.

Referring particularly to the drawings for the purposes of illustration only and not limitation.

DETAILED DESCRIPTION OF PREFERRED EMBODIMENTS

Figure 1:
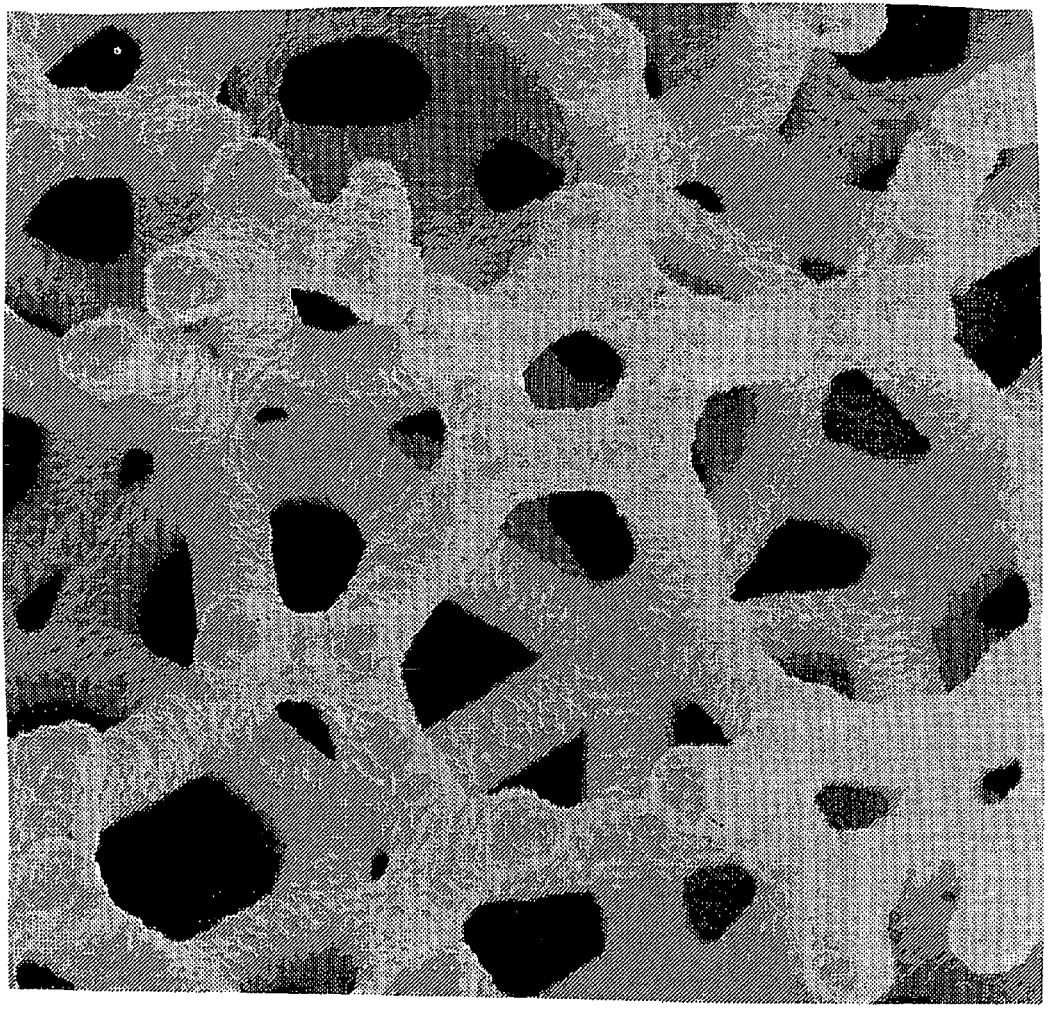
FIG. 1 is a scanning electron microscope image of a reticulated tantalum foam substrate suitable for use as a reticulated foam substrate according to the present invention.
Figure 2A:
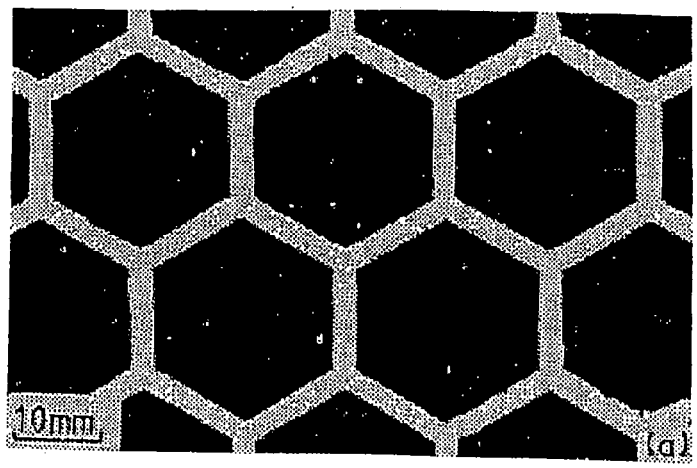
FIG. 2(a) is a photograph taken through a microscope of a regular rigid honeycomb substrate suitable for use as a substrate according to the present invention.
Figure 2B:
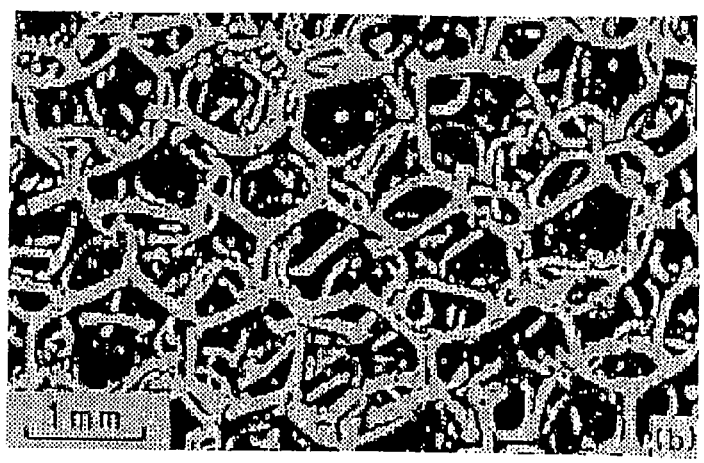
FIG. 2(b) is a photograph taken through a microscope of a rigid reticulated foam substrate suitable for use as a substrate according to the present invention.
Figure 2C:
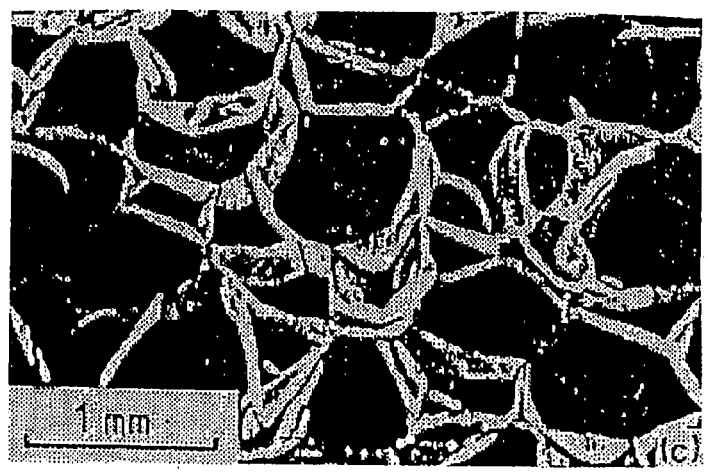
FIG. 2(c) is a photograph taken through a microscope of a rigid closed cell foam substrate suitable for use as a substrate according to the present invention.

In a preferred embodiment of the invention, which has been selected for purposes of illustration only and not limitation, a regeneratively cooled, liquid propellant rocket engine was fabricated. The porous material was used as a heat exchanger to cool the inner wall of the rocket. This structure consisted of an inner wall of rhenium, encased in a rhenium-carbon open-cell foam heat exchanger, which is skinned with an Inconel alloy shell by a thermal spray processing. The inner rhenium shell and the outer Inconel shell were leak free and capable of containing flowing hydrogen at 500 to 1000 pounds per square inch (psi). In the manufacture of this embodiment, a molybdenum mandrel was fabricated whose outer surface replicated the desired inner geometry of the rocket. The outer surface of the mandrel was then coated with rhenium by chemical vapor deposition procedures (CVD) to a thickness of 1.5–2.5 mm. A block of open-pore, vitreous carbon foam (20 mm×20 mm×30 mm) was then pressed onto the outer cylindrical surface of the coated mandrel until a cavity was formed (by crushing the foam and breaking ligaments) in the carbon foam. This replicated half of the mandrel so that the carbon foam encased half of the coated mandrel. This process was then repeated on the unencased half of the coated mandrel with another similar block of carbon foam, such that the entire coated mandrel was encased in conforming carbon foam. The outer surface of the carbon foam was then machined such that the thickness of the carbon foam was about 4 mm thicker than required for the heat exchanger. The unit was then processed by CVD procedures such that the carbon foam was coated throughout with rhenium to a density of about 1–2 grams per cubic centimeter (g/cc) and simultaneously bonded/attached to the rhenium coating on the mandrel. The reticulated carbon foam served as a skeleton to define the shape of the reticulated rhenium deposit. The carbon skeleton was fully encapsulated. The outer surface of the rhenium foam was then machined to the desired dimensions such that the foam heat exchanger was about 5 mm thick. The outer surface of the foam was then thermally sprayed with inconel to a thickness of about 5 mm. The continuous inconel layer or skin bonded tightly to the rigid reticulated rhenium foam throughout the exposed surface of the foam. The inconel penetrated from about 1 to 2 cell diameters into the foam. The bond was stronger than the foam in shear. The inconel layer was then machined to the desired dimensions and the molybdenum mandrel was chemically removed. Manifolds were then welded to both ends to complete the assembly.

In another preferred embodiment of this invention, a prototype thermal protection tile, such as might be used on the Space Shuttle, was fabricated. In this embodiment, a tile of open-cell vitreous carbon foam, about 150 mm×150 mm×13 mm, was infiltrated by CVD procedures with silicon carbide to a density of about 0.5 grams per cubic centimeter (g/cc). One face of the tile was then thermally sprayed with a mixture of silicon carbide and molybdenum disilicide to a thickness of about 0.5 mm. This skin was provided for the purposes of oxidation protection. The continuous molybdenum disilicide coating penetrated on the average from about 1 to 2 cell diameters into the foam, and was tightly and uniformly bonded to the foam. The bonding was such that attempts to peel off the skin caused the foam to fracture in the foam below the bonding area. That is, the bond was stronger than the foam in peel testing. In use, the unskinned side of the tile can be bonded to the vehicle.

In another preferred embodiment of this invention, a means was developed for structurally attaching a biocompatible, open-pore tantalum foam component to a solid titanium component to be implanted into a human being. In this embodiment, one face of the tantalum foam component was thermally sprayed with titanium to create a skin about 0.1 mm thick. The titanium penetrated the reticulated tantalum foam for an average depth of about 1 to 2 cell diameters and was rigidly bonded to the foam. This continuous titanium skin was then brazed to the titanium component using a biocompatible braze alloy.

In an additional preferred embodiment, a flat composite plate was prepared and tested. A block of 100 ppi, 20 percent dense reticulated silicon carbide foam about 6 inches square and 1 inch thick was selected. A skin was formed on one 6 inch square flat surface by thermal spraying. A mixture of molybdenum disilicide ($MoSi_2$) particles and about 30 percent by volume of silicon carbide particles was thermally sprayed onto the flat surface of the silicon carbide foam. The silicon carbide particles did not melt, but the molybdenum disilicide did so as to form a matrix for the silicon carbide. The skin was sprayed to a thickness of about 20 mils of which about 3 to 5 mils was imbedded in the reticulated foam. The panel was tested by subjecting it to the flame from an oxyacetylene torch at approximately 1700 degrees centigrade for a period of about 30 minutes. The tested panel exhibited very little mass or volume change. The dimensions and shape remained substantially unchanged.

This example was repeated using an 8 inch long tube as the test specimen. The tube of 100 ppi, 70 percent porous, reticulated silicon carbide foam had an inside diameter of about 1.3 inches and an outside diameter of about 2.3 inches. All of the surfaces of the tube were coated, as described above, with a 20 mil thick molybdenum disilicide matrix containing about 30 percent by volume of imbedded silicon carbide particles. The coating or skin penetrated the silicon carbide foam to a depth of from about 2 to 3 pores. An inlet manifold was attached to one end of the tube and an outlet manifold was attached at the other. The skin was removed where the manifolds were attached so that they communicated directly with the interior of the foam tube. Hydrogen under pressure was injected into the inlet manifold, allowed to flow through the foam and into the outlet manifold. This served as a proof of concept for an actively cooled rocket chamber. In use as a rocket chamber the hydrogen or other coolant would flow countercurrent to the exhaust gas in the chamber, and the coolant would comprise one of the propellants. Thus, the coolant would be conducted from the exhaust manifold into the combustion chamber. For a hydrogen based coolant system the other reactant would be, for example, oxygen.

Repeating these examples with various materials indicates that the present invention is particularly well suited to the application of ceramic skins on ceramic substrates. Oxides, such as, for example, aluminum oxide and zirconium oxide are particularly well suited for application by thermal spray techniques, as are steels, super alloys, and the like.

The composite structures according to the present invention are particularly well suited for use as high temperature heat exchangers, actively cooled engines or airframe structures, combustion chambers, nozzles, and the like.

Repeating these examples using closed cell 30 ppi foams produces formed in situ skins that are tightly and uniformly bonded to the foam substrates.

Suitable materials for use as either skins or substrates include, for example, metals, ceramics, glasses, organic and inorganic polymers, and the like. The choice of materials for skins and substrates is generally dictated by the desired end use. The nature of thermal spraying indicates that the rigid foam substrate must generally have a melting or decomposition point that is high enough that it is not melted or degraded during the thermal spraying process. Also, the rigid foam must be capable of withstanding the force of the thermal spray without significant breakage. Substantially all of the materials that can be foamed or sprayed are available for selection. For example, biocompatible materials such as, for example, tantalum, titanium and the like are often used for both the substrate and the skin where the composite skinned foam product is intended for use as a biomedical implant. Refractory metals are generally used for both the foam substrate and the formed in situ skin where strength at high temperatures is required. The materials can be directly foamed or they can be built up by coating the interstices of reticulated skeletons, or the like. For example, carbon skeletons are often used in the production of metallic foams. A carbon skeleton of the desired pore size is formed and then coated throughout with the desired metal using, for example, CVD procedures. Often the metal itself can not be foamed. Such built up foams are considered to be foam substrates for the purposes of this disclosure and the claims appended hereto. Pore sizes from about 20 to 30 ppi to 250 ppi or more are often present in the substrate. The lower the number of pores per inch, generally the more difficult it is to achieve a uniform hole-free skin. Such low pore count substrates are, however, particularly desirable where it is desired to minimize weight or to maximize the flow rate or volume of a fluid through the substrate. Reticulated, that is, open-cell rigid foam substrates are preferred where it is desired to pass a fluid through the substrate. Also, reticulated foams tend to be preferred where weight is to be minimized, and where it is desired that the bonding of the skin extend more than one cell deep into the substrate.

Two of the significant parameters that control the penetration of the sprayed fluid skin material into the porous substrate are the as sprayed viscosity and velocity of the particles. As will be understood by those skilled in the art, trial and error allows the adjustment of the spray parameters so that the desired penetration is achieved for a particular application.

The skin can be applied to one or more surfaces of the solid foam substrate, as a solid uniform complete covering or as a patterned covering, as may be desired. The skin can be applied for a variety of purposes or combination of purposes. It can, for example, serve as the pressure or fluid retaining wall of a pressure vessel or a conduit, as a structural member or a thermal or corrosion barrier, or the like. The formed in situ skins serve their intended purposes particularly well because they are uniformly bonded to the boundary of substantially each pore, generally without a significant excess of skin material at any location. In general, the properties of the foam substrate are such that it is not significantly degraded by melting or the force of the impact from the thermally sprayed skin. Also, the properties of the material from which the skin is formed should in general be such that they are amenable to being thermally sprayed using conventional thermal spraying techniques. Also, these materials should not suffer significant degradation of their properties due to being melted instantaneously in the thermal spraying process. Thus, the preferred materials are inorganic materials with relatively stable compositions in the molten phase. Generally, it is preferred that these materials can be thermally sprayed in the ambient environment, that is, at room temperature and in the open air. Special atmospheres can be provided by gas blanket or confined environments, if required. Low pressure thermal spraying in a vacuum or inert atmosphere can also be employed if desired.

What have been described are preferred embodiments in which modifications and changes may be made without departing from the spirit and scope of the accompanying claims. Obviously many modifications and variations of the present invention are possible in light of the above teachings. It is therefore to be understood that, within the scope of the appended claims, the invention may be practiced otherwise than as specifically described.

What is claimed is:

1. A composite rigid foam structure comprising:
   a rigid reticulated foam substrate made of ceramic or metal having a surface and pores, said pores having an average diameter, and
   a formed in situ skin comprising molybdenum disilicide substantially uniformly bonded directly to at least a portion of said surface, said skin generally penetrating said rigid foam substrate to a depth of from about 1 to about 5 of said average pore diameters, said skin having a substantially uniform interconnected porosity and adapted to allowing gas to flow through said skin and out of said composite rigid foam structure.

2. A composite structure of claim 1, wherein said rigid reticulated foam substrate comprises material having at least about 20 pores per linear inch.

3. The composite structure of claim 1, wherein said rigid reticulated foam substrate comprises ceramic.

4. The composite structure of claim 1, wherein said rigid reticulated foam substrate comprises refractory metal.

5. The composite structure of claim 1 wherein the continuous skin has penetrated into said rigid reticulated foam substrate for a depth of less than approximately 2 average pore diameters.

6. A composite rigid foam structure comprising:
   a rigid reticulated foam substrate made of ceramic or metal having a surface and pores, said pores having an average diameter, and
   a formed in situ skin comprising molybdenum disilicide substantially uniformly bonded directly to at least a portion of said surface, said skin generally penetrating said rigid foam substrate to a depth of from about 1 to about 5 of said average pore diameters, said skin having a substantially uniform interconnected porosity and adapted to allowing substantially uniform gas flow through said skin and out of said composite rigid foam structure.

7. A composite rigid foam structure comprising:
   a rigid reticulated foam substrate made of ceramic or metal having a surface and pores, said pores having an average diameter, and
   a formed in situ skin comprising molybdenum disilicide substantially uniformly bonded directly to at least a portion of said surface, said skin generally penetrating said rigid foam substrate to a depth of from about 1 to about 5 of said average pore diameters, said skin having a substantially uniform interconnected porosity extending entirely therethrough and adapted to allowing transpiration cooling of said composite rigid foam structure.

8. A composite rigid foam structure comprising:
   a rigid reticulated foam substrate comprising ceramic and having a surface and pores, said pores having an average diameter, and
   a formed in situ skin comprising molybdenum disilicide, said skin being substantially uniformly bonded directly to at least a portion of said surface, said skin generally penetrating said rigid foam substrate to a depth of less than about 5 of said average pore diameters, said skin having an interconnected porosity and adapted to allowing gas to flow through said skin and out of said composite rigid foam structure.

9. A composite rigid foam structure comprising:
   a rigid reticulated foam substrate comprising metal and having a surface and pores, said pores having an average diameter, and
   a formed in situ skin comprising molybdenum disilicide, said skin being substantially uniformly bonded directly to at least a portion of said surface, said skin generally penetrating said rigid foam substrate to a depth of less than about 5 of said average pore diameters, said skin having an interconnected porosity and adapted to allowing gas to flow through said skin and out of said composite rigid foam structure.

10. A composite rigid foam structure of claim 9 wherein said rigid reticulated foam substrate comprises refractory metal.

* * * * *